United States Patent [19]

Soria et al.

[11] Patent Number: 5,409,609

[45] Date of Patent: Apr. 25, 1995

[54] MEMBRANE APPARATUS FOR PERFORMING FILTRATION, SEPARATION, OR A CATALYTIC REACTION

[75] Inventors: Raymond Soria, Bazet; Sophie Cominotti, Tarbes; Jacques Gillot, Laloubere, all of France

[73] Assignee: Societe Des Ceramiques Techniques, Bazet, France

[21] Appl. No.: 92,896

[22] Filed: Jul. 19, 1993

[30] Foreign Application Priority Data

Jul. 20, 1992 [FR] France ................ 92 08925

[51] Int. Cl.$^6$ ............................. B01D 63/00
[52] U.S. Cl. ................ 210/321.72; 210/490; 210/500.25; 210/500.26; 210/500.27; 210/506; 210/510.1; 210/321.6; 427/397.7; 204/157.44
[58] Field of Search ........ 210/510.1, 490, 506, 210/321.75, 503, 496, 336, 433.1, 500.25, 500.26, 321.79, 500.27, 321.72; 55/523, 524; 204/157.15, 157.44; 427/245, 372.2, 397.7

[56] References Cited

U.S. PATENT DOCUMENTS

| | | | |
|---|---|---|---|
| 3,610,418 | 10/1971 | Calderwood | 210/490 |
| 4,069,157 | 1/1978 | Hoover et al. | 210/510.1 |
| 4,900,517 | 2/1990 | Domsle et al. | 423/213.7 |
| 4,946,592 | 8/1990 | Galaj et al. | 210/490 |
| 5,106,502 | 4/1992 | Goldsmith | 210/490 |
| 5,112,884 | 5/1992 | Hanke | 523/116 |
| 5,194,154 | 3/1993 | Moyer et al. | 210/510.1 |
| 5,221,484 | 6/1993 | Goldsmith et al. | 210/510.1 |
| 5,260,035 | 11/1993 | Lachman et al. | 55/524 |

FOREIGN PATENT DOCUMENTS 2130823  11/1972  France .
0442410   8/1991  France .

OTHER PUBLICATIONS

French Search Report FR 9208925—dated Apr. 8, 1993.

H. Schmidt et al, "Hot Melt Adhesives for Glass Containers by the Sol–Gel Process", *Journal of Non-Crystalline Solids*, vol. 80, pp. 557–563—1986.

*Primary Examiner*—Frank Spear
*Assistant Examiner*—Ana M. Fortuna
*Attorney, Agent, or Firm*—Sughrue, Mion, Zinn, Macpeak & Seas

[57] ABSTRACT

Membrane apparatus for performing filtration, separation or a catalytic reaction, the apparatus including a macroporous block provided with parallel longitudinal through channels, the surface of each channel being covered with a respective membrane having finer pores than those of the block. According to the invention, the pores in both ends of said block are filled with a dense material (3) formed by a monometallic or polymetallic organic-inorganic polycondensate which has been subjected to heat treatment, this type of condensate being known under the name of ORMOSIL (organically modified silicate) or ORMOCER (organically modified ceramic).

20 Claims, 3 Drawing Sheets

MEMBRANE APPARATUS FOR PERFORMING FILTRATION, SEPARATION, OR A CATALYTIC REACTION

The present invention relates to membrane apparatus for performing filtration, separation, or a catalytic reaction, the apparatus including a macroporous block (also referred to as a "support") made of a material chosen from a sintered ceramic, a sintered metal, glass, and carbon; the block is provided with one or more parallel longitudinal through channels, the surface of each channel being covered with a respective membrane constituted by one or more layers, and made of a material chosen from an organic substance, a sintered ceramic, glass, and carbon, optionally modified by adding substances having catalytic properties; the membrane has finer pores than those of said block, or it is permeable by diffusion; the apparatus further includes means for inserting a fluid to be purified at one end of each of said channels, means for collecting a purified fluid that are associated with the side surface of said block, and means for collecting a residual fluid at the other end of each of said channels.

Patents FR-A-2 061 933 and U.S. Pat. Nos. 4,069,157 disclose filtration apparatuses in which the liquid to be filtered arrives via an inlet chamber at an inlet end of the block, and flows through the channels to an outlet end and into an outlet chamber. The filtrate passes radially through the membranes of the channels, then through the block which has larger pores than those of the membrane, and is collected outside the block. A residual liquid is collected in the outlet chamber and is recycled.

In those apparatuses the liquid to be filtered tends to leak out both at the inlet end and at the outlet end of the block. In between the channels, both on the inlet face and on the outlet face of the block, the liquid is in direct contact with the block itself (with its larger pores), and a certain fraction of the liquid passes through the block and reaches the filtrate, thereby reducing the purity thereof. Therefore, high levels of purity can only be achieved by performing a plurality of successive filtrations. The greater the mean diameter of the pores in the macroporous block, the larger the leaks. In general, said mean diameter lies in the range 4 $\mu$m to 20 $\mu$m.

It is possible to mount the block between parallel gaskets, but this gives rise to assembly difficulties and it does not avoid residual leaks.

Patents EP 0 154 295 and EP 0 442 410 disclose methods of reducing the leaks by filling the ends of the macroporous block with ceramic or polymer particles. But, although they improve the situation, those methods do not make it possible to achieve defect-free end sealing. In any case, a block filled in those ways is totally inadequate for membranes used for ultrafiltration, nanofiltration, reverse osmosis, pervaporation or gas separation. The denser the separating layer (as is the case in gas separation or pervaporation) the more marked the inadequacy.

If attempts are made to avoid the problem by filling the ends of the porous material by means of a series of suspensions of increasingly fine ceramic or polymer particles (such techniques are described in Patents EP 0 154 295 and EP 0 442 410), it is difficult to control the extent to which the slip penetrates with each successive addition thereof. Serious problems of cracking are also encountered, due to shrinkage during sintering of the material. The smaller the particles to be sintered, the greater the shrinkage. Finally, the manufacturing time and costs involved in performing filling in successive steps are prohibitive for industrial uses.

EP 0 154 295 also describes filling the pores with an enamel. However several problems are encountered. It is necessary to use enamels having coefficients of expansion that are well-matched with that of the membrane. Furthermore, industrial use of microfiltration membranes involves washing with acids and bases at high concentrations and at temperatures in the range 80° C. to 100° C. No enamel exists that can resist both highly concentrated acids and highly concentrated bases. Moreover, enamels are baked at temperatures that are higher than the temperatures at which ultrafiltration layers are sintered. This is even more marked with layers used for nanofiltration, for reverse osmosis, or for gas separation. Therefore, the separation layer can be deposited only once the enamel is in place, and there may be a considerable amount of cracking at the interface between the layer and the enamel.

Finally, the material used for filling the end pores may be a polymerizable liquid resin. Such resins are suitable only when the filtration apparatus is neither subjected to high temperatures, nor to large variations in temperature, that would give rise to considerable thermal stresses because of the differences between the coefficients of expansion of resins and of ceramic membranes. However, in addition to chemical washing at temperatures in the range 80° C. to 100° C., industrial use of filtration membranes involves steam sterilizing at temperatures of about 120° C.

It is possible to cover the ends of a membrane with the layer used for separation. However, it is observed that sealing performance levels deteriorate relatively quickly. This is because the layer undergoes progressive erosion due to the many frontal and direct shocks between the layer and the particles in the fluid under treatment. Since the purpose of the layer is to provide optimum filtration performance levels, its structure is as porous as possible, and this is incompatible with the mechanical strength criteria required for end sealing.

Currently, there is no satisfactory method of filling the pores in the ends of the membranes, and thereby avoiding fluid leakage, whether the membranes are for ultrafiltration, nanofiltration, reverse filtration, or gas separation. Each of the suggested methods has its own limitations: filling with ceramics in powder form does not enable properly sealed ends to be obtained, using an enamel or an organic polymer seals the ends but is not satisfactory with respect to chemical resistance and expansion, and, finally, depositing an end layer is not satisfactory with respect to erosion.

An object of the present invention is to provide apparatus for performing separation by using a membrane, in particular for filtration, the apparatus making it possible to obtain a purified fluid of high purity by providing the ends of the macroporous block with sealing that is effective, that offers good mechanical strength and chemical resistance, and that offers good resistance to abrasion, so as to mitigate the above-described drawbacks.

The present invention provides membrane apparatus for performing filtration, separation or a catalytic reaction, the apparatus including:

a macroporous block made of a material chosen from a sintered ceramic, a sintered metal, glass, and carbon, and provided with parallel longitudinal through channels, the surface of each channel being covered with a respective membrane made of a material chosen from an organic substance, a sintered ceramic, glass, and carbon, and having finer pores than those of said block, or being permeable by diffusion, said material optionally being modified by being doped with catalysts;

means for inserting a fluid to be purified at first ends of said channels;

means for collecting a purified fluid that are associated with the side surface of said block; and means for collecting a residual fluid at second ends of said channels;

the pores in both ends of said macroporous block being filled with a dense material;

said apparatus being characterized by the fact that said material is formed by a monometallic or polymetallic organic-inorganic polycondensate which has been subjected to heat treatment, this type of condensate being known under the name of ORMOSIL (organically modified silicate) or ORMOCER (organically modified ceramic).

In a variant embodiment, said pores in both ends of said macroporous block are previously made smaller by depositing small particles therein.

In both cases, by using a scanning electron microscope, it can be observed that the pores at the ends of the block are very well filled. The filling may be characterized by various measuring techniques. When measured by using a pycnometer, the porosity of each of the ends of the macroporous block is considerably reduced, because, at the most, it represents 1% of its initial porosity, i.e. of its porosity prior to being filled with the ORMOSIL/ORMOCER. It is not possible to detect any open pores in the ends with a mercury porosimeter, i.e. no signal is measured on the impregnated faces. This result is confirmed by the bubble point method described by T. H. Meltzer (Bul. Par. drug ass. vol. 65(4), 165-174, 1971). The results obtained with respect to the quality of sealing of the impregnated regions are similar to those obtained using sealing based on enamels or polymer resins.

Thus, by means of their appropriate properties, the ORMOSILS/ORMOCERS make it possible to provide the macroporous block with sealed ends that offer both the positive aspects of enamel or resin sealing (very good sealing), and those of ceramic sealing (very high resistance to corrosion).

Various products of the ORMOSIL/ORMOCER type have already been described in the literature.

For example, reference may be made to Schmidt & Seiferling (Mat. Res. Soc. Symp. Proc., 73, 1986, 739-750); Kohjiya, Ochiai & Yamashita (J. Non-crystalline solids, 119, 1990, 132-135); Dire, Babonneau, Carturant & Livage (6th Glass Workshop, Seville, 1990), who demonstrate the precipitation of metal oxide particles during hydrolysis, which precipitation prevents high metal contents from being included; and Hou & Scholze (J. Non-Crystalline Solids, 100, 1988, 418-423), who modify metal alkoxides so as to reduce their reactivity and their hydrolysis.

However, according to the invention, ORMOCERS are implemented having specific compositions, having high metal atom contents, and corresponding to the following generic formula:

$$C_vH_wO_xSi_yMe_z (I)$$

where:
v=4 to 48 w=5 to 52
x=5 to 48
y=2 to 16
z=1 and where Me represents at least one metal chosen from groups IVA (such as Ti, Zr, and Hf), VA (such as Ta), VIA (e.g. W), IIIB (e.g. Al), and IVB (such as Si) of the periodic table of elements, and preferably zirconium, hafnium and tantalum, the ratio v/(y+z) being less than 7 and preferably less than 5.

Such high metal atom content ORMOCERS are obtained by causing:

one or more metal derivatives of the $MeR_X$ type (II), where Me has the above-described definition, and where R represents either a hydrolyzable group such as a halogen atom, alcoxy, acryloxy, acetyl acetonate, or preferably alcoxy, or else a hydroxy group, and X represents the valence of the metal element;

to react with one or more functionalized silanes of general formula:

$$R'_nSi(R''Y)_{(4-n)} (III)$$

where:
n is less than 4.

R' represents one or more hydrolyzable organic groups of the alcoxy, aryloxy, or hydrogen atom type, or else a hydroxy group;

R''Y represents a functionalized and non-hydrolyzable chain in which R'' represents a chain that is carbon-containing, saturated, unsaturated, cyclic or aromatic, optionally including heteroatoms such as oxygen; and Y represents a remainder that is reactive under the reaction conditions, such as an epoxy group or an unsaturate, and e.g. a vinyl group or an allyl group.

Synthesizing such high metal content ORMOCERS is performed in a plurality of steps: the liquid precursor is synthesized, and said precursor is then cross-linked (this step takes place once the liquid precursor has been infiltrated into the pores of the ends of said block).

In a first stage of the first step, the functionalized silane (III) is partially prehydrolyzed by adding water in an acid or a basic medium. The hydrolysis releases some of the condensation sites on the silicon for the metal compound. In order to control the hydrolysis better, it is preferable to add acid in the form of an alcohol solution, the water being added separately. This technique enables the quantity of water required for the hydrolysis to be better determined. The metal derivative (II) is then added. The metal derivative then condenses on the hydrolyzed positions of the functionalized silane.

Prehydrolyzing the silane derivative enables the alkoxide to condense on the hydrolyzed positions of the silicon. It is thus possible to add high metal alkoxide concentrations without the metal alkoxide precipitating, thereby forming particles of metal oxide in the organosilicon lattice. This phenomenon is highly detrimental to all the properties of the ORMOCER.

The reaction is continued by performing a reflux step which enables the molecular polycondensation to be completed.

In a last stage of the first step, the solvents together with the condensation products (water and alcohol) or the hydrolysis products, and the catalysts such as HCl are completely removed.

By using this method, it is possible to obtain a liquid ORMOCER precursor which can be infiltrated into the pores of the membrane of the invention. This precursor is then thermally polymerized in situ (in the pores) using the Y functional group initially carried on the silane molecule to give the ORMOCER.

Depending on the type of the metal atoms that they contain, the following results are observed for the ORMOCERS: their chemical resistance, in particular to corrosion by acids and by bases, increases, their coefficients of expansion are reduced, and their thermal stability is increased. It is thus possible to adapt the composition of the ORMOCER to a specific use.

The membrane apparatus made with the preferred ORMOCER has extremely high resistance to chemical corrosion, in particular to very acid pH (pH≦0) and to very basic pH (pH≧14), even at temperatures of about 100 degrees. The results obtained with respect to the chemical resistance of the impregnated regions are similar to those obtained with ceramic-type sealing.

The present invention also provides a filling method for filling the pores in the ends of the macroporous block in an above-defined membrane apparatus, said method being characterized by the fact that it comprises:

a first step in which an organic-inorganic condensate is prepared, said condensate being a precursor of the ORMOSIL or of the ORMOCER, being liquid, and being thermally polymerizable by means of reactive groups regularly distributed in the chain of the precursor, the solvents inserted during the preparation or resulting therefrom being removed before the polymerization is performed, and e.g. by evaporation under a vacuum;

a second step in which each end of the macroporous block is successively immersed in the pure ORMOSIL/ORMOCER precursor; and a third step in which the precursor is polymerized.

The pores at the ends of the macroporous block are thus filled with a liquid precursor of the ORMOSIL/ORMOCER, which precursor corresponds to a synthesized intermediate product that is transformed into an amorphous matrix by polymerization.

The polymerization may be performed increasing temperature (thermal polymerization). The thermal cycle used for the polymerization is characterized by the following three specific points:

a) temperature is increased relatively slowly (30° C./hour at the most);

b) there is a long pause at a temperature lying in the range 60° C. to 100° C; and c) there is a cross-linking pause at a temperature lying in the range 110° C. to 160° C.;

so as to obtain the most uniform polymerization possible.

Where applicable, it is possible to repeat the steps one or more times so as to obtain the desired filling density. During thermal polymerization, it is necessary to comply strictly with a specific thermal cycle so as to obtain uniform polymerization of the precursor of the ORMOCER, which is split up into small polymerization areas (the pores of the block), and so as to avoid including micro-domains that enclose the exhaust products of polymerization (e.g. water in the case of epoxy silanes).

In a first variant of the method, filling is performed under ultrasound. By stirring the immersion bath by means of ultrasound, it is possible to increase the quantity of precursor infiltrating into the pores in the membrane. Furthermore, the ultrasonic waves cause intramolecular rearrangements of the ORMOSIL/ORMOCER chains in the pores. Such rearrangements create bonds between ORMOSIL/ORMOCER chains. In addition to these bonds, there are the bonds formed during baking for cross-linking purposes. The ORMOSIL/ORMOCER ultimately obtained has a concentration of "interchain" bonds that is higher than it would have been in the absence of ultrasound. The higher concentration of bonds causes an improvement in the physico-chemical properties of the product, in particular in its coefficient of expansion and in its chemical resistance.

In a second variant, after the stage in which its pores are infiltrated, the end of said block filled with ORMOCER precursor is exposed to ionizing radiation, e.g. gamma radiation or electron radiation. This radiation causes reaction centers to be formed, which centers cause additional bonds to be formed between the various ORMOSIL/ORMOCER chains, in addition to the bonds formed during cross-linking baking. The higher concentration of bonds causes an improvement in the physico-chemical properties of the product, in particular in its coefficient of expansion and in its chemical resistance.

Other characteristics and advantages of the present invention will appear on reading the following description of embodiments given by way of non-limiting example and with reference to the accompanying drawings, in which:

DESCRIPTION OF THE INVENTION

Figure 1:
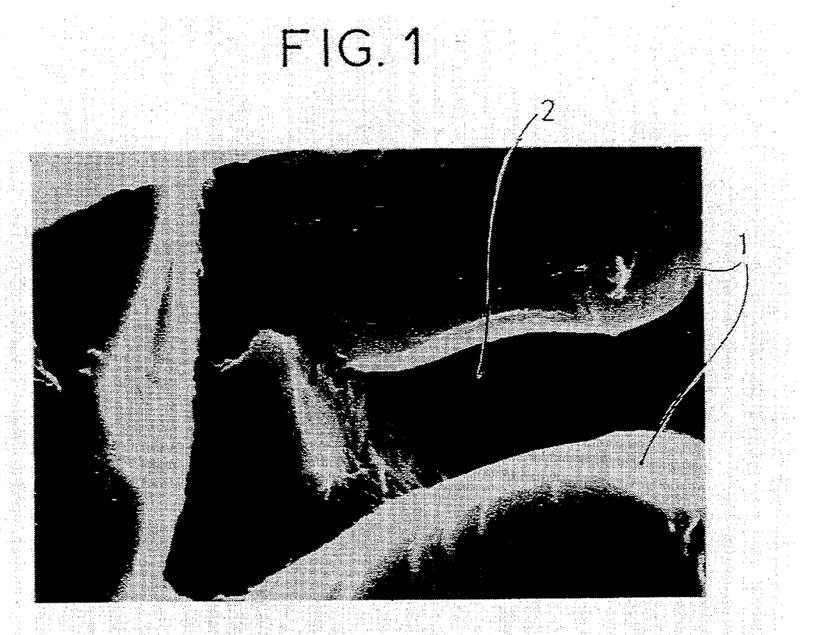
FIG. 1 shows an enlarged photo of the macropores in a support block which is part of apparatus of the invention, the photo being taken before the block has been filled with the ORMOCER.
Figure 2:
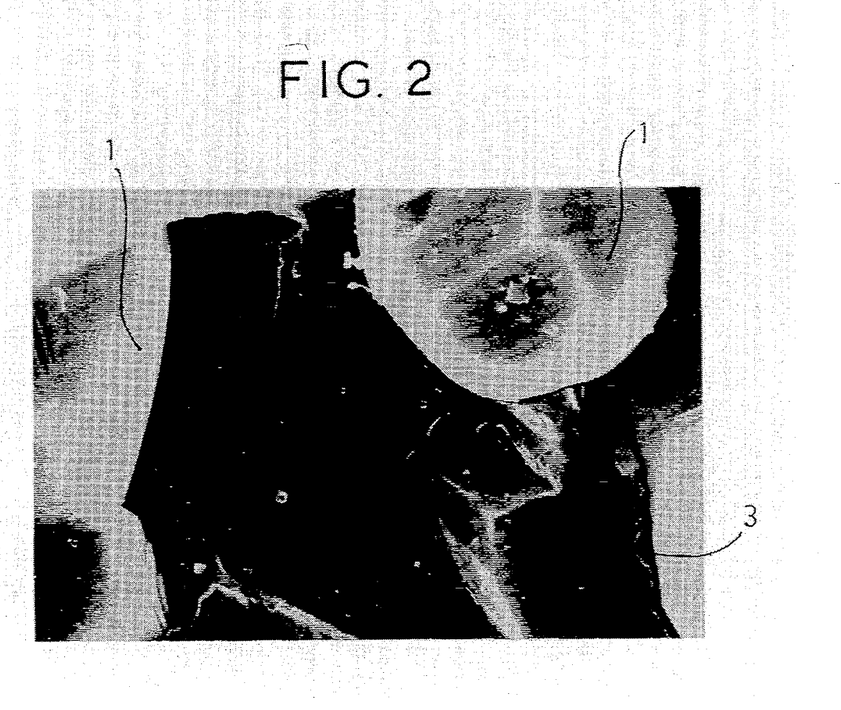
FIG. 2 shows the macropores in the block shown in FIG. 1 and filled with an ORMOCER of the invention.

FIG. 1 shows alumina grains 1 in a support block with pores 2 of a plurality of microns in mean diameter. In FIG. 2, the pores 2 have been filled with ORMOCER 3 in its liquid state, thereby enabling optimum and defect-free filling to be obtained. The ORMOCER has been solidified by cross-linking baking at a low temperature (less than 200° C). The cross-linking bonds the ORMOCER chains together, and it is obtained with no shrinkage or cracking, thereby making it possible to retain the filling quality obtained. A solid phase is thus formed which seals the end of the block and renders it impermeable. Use of a scanning microscope enables pore-filling to be observed very well.

Figure 3:
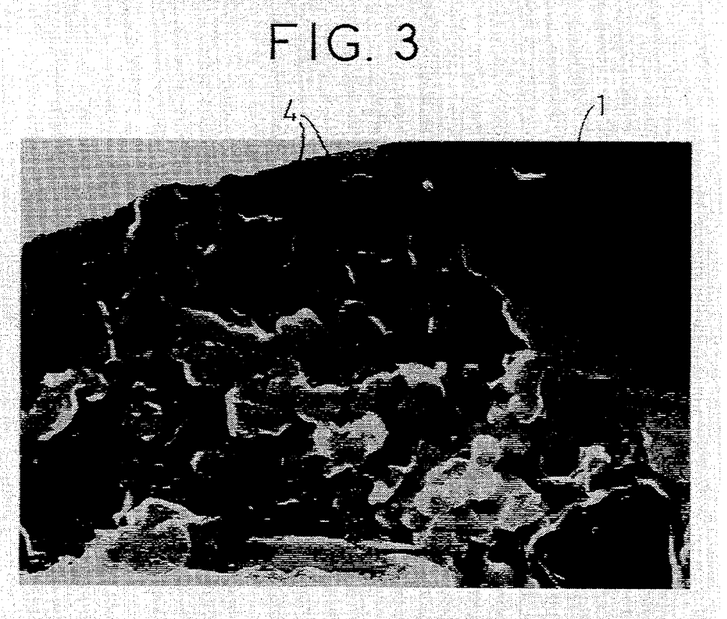
FIGS. 3 and 4 are analogous to FIGS. 1 and 2, but the macropores have been made smaller previously by using small particles.

FIG. 3 shows that the pores have been previously filled with small sealing particles using a known method.

Figure 4:
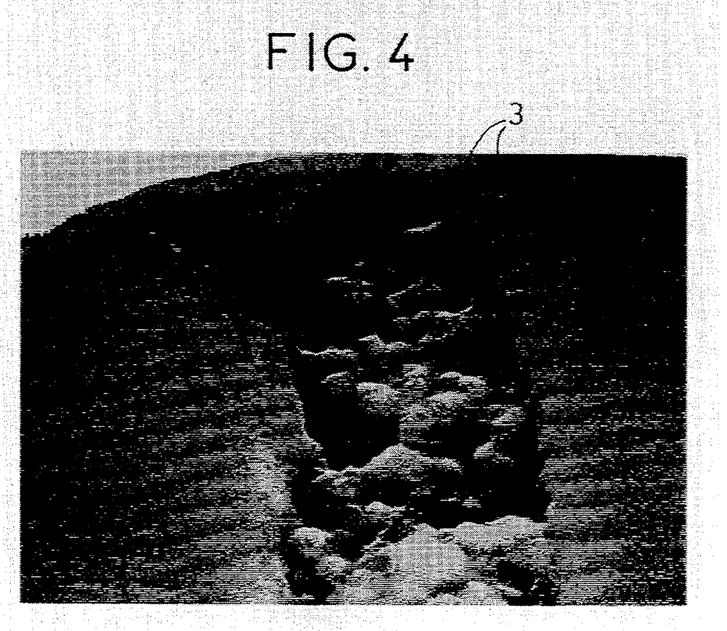

FIG. 4 shows the effect of filling the pores shown in FIG. 3 with an ORMOCER 3.

Figure 5:
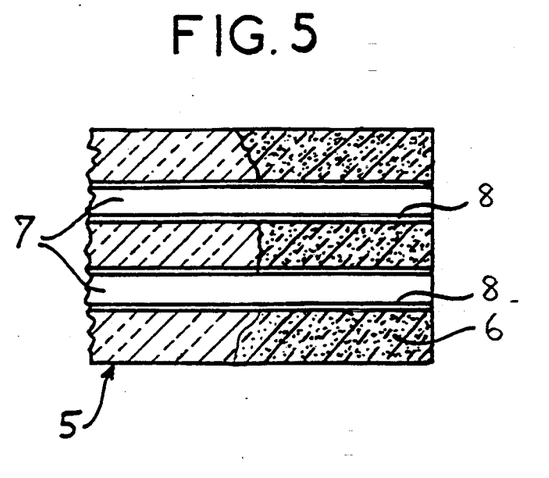

FIG. 5 shows a macroporous block 5 having an end 6 which is leakproofed according to the present invention. The macroporous block 5 has channels 7 which are lined with a membrane 8.

The resulting sealed end of the macroporous block has characteristics that are identical to those of the end described above with reference to FIGS. 1 and 2. This variant offers the advantage of reducing the quantity of ORMOCERS required to obtain this result.

The following examples referenced 1 to 7 give specific embodiments.

EXAMPLE 1

The end of a filter member was to be sealed, the member being constituted firstly by a support made of porous alumina (porosity 40%, mean pore diameter 15 μm) and provided with 19 through channels of 4 mm in diameter, and secondly by two superposed layers having mean pore diameters of 800 nm and 200 nm.

An ORMOCER was prepared, and both of the ends of the macroporous block were impregnated with the ORMOCER. The liquid penetrated into the macroporous block over a distance of 18 mm. The surplus ORMOCER was removed by draining, and the block was then subjected to polymerization baking at 130° C. The temperature was increased at a speed of 10° C./hour, with a pause of 5 hours at 65° C. There was a second pause of 4 hours at the baking temperature.

Observation under a microscope showed that the pores in the ends of the macroporous block were completely filled. Measuring the porosity of the block gave a residual porosity of 0.1%, i.e. 0.25% of the initial porosity Use of a mercury porosimeter on the resulting sealed ends of the macroporous block did not make it possible to measure pore diameter.

Resistance to chemical corrosion was measured by means of a filtration loop. This test was representative of the real use of the membranes. The corrosive solutions ($HNO_3$ 6% by mass, pH=0, and NaOH 4% by mass, pH=14) were hot (70°) and they flowed along the membranes and through them by permeation. The acid solution flowed over and through the membrane for 20 minutes, and the membrane was then rinsed with cold water (20° C.) before being put into contact with the basic solution for 20 minutes. Final rinsing was then performed. Membranes subjected to 100 cycles of this type suffered no degradation in their characteristics.

EXAMPLE 2

The end of a tube (inside diameter: 30 mm; outside diameter: 36 mm) was to be sealed, the tube being made of sintered stainless steel, and having porosity of 50% and mean pore diameter of 20 μm. An ORMOCER was prepared, both ends of the macroporous block were impregnated with the ORMOCER which penetrated into the macroporous block over a distance of 10 mm. After draining and solidifying, cross-linking baking was performed at 100° C. for two hours after a first pause of 8 hours at 50° C., the temperature rising at a speed of 10° C./hour. After cooling, a second sealing step was performed under the same conditions and with the same product. Baking was performed under the same conditions.

Observation of the porous block (polished section) under a microscope showed that the pores were completely filled. The residual porosity of the impregnated region of the macroporous block was 0.2%, i.e. 0.4% of the initial porosity, and, moreover, use of a mercury porosimeter did not show up any pores. The resulting sealed membrane passed the corrosion test described in example 1.

EXAMPLE 3

The end of a multi-channel nanofilter member was to be sealed. The end of the member was partially stopped with a ceramic powder, and had a residual porosity of about 20%, with a pore diameter of 1 μm.

For this purpose, an ORMOCER was prepared by prehydrolyzing (3,4 epoxy cyclohexyl) ethyl trimethoxy silane (120 millimoles) with an aqueous solution of hydrochloric acid (0.009 millimoles) overnight. 30 millimoles of zirconium isopropoxide and 0.208 millimoles of hydrochloric acid in aqueous solution were then added. Condensation was completed by performing a reflux step (70° C.) for 30 minutes. After the solvents had been removed by evaporation in a vacuum and cooling, a viscous liquid (120 mPas) was obtained.

Chemical analysis gave the following formula as the composition of the ORMOCER:

$C_{32}H_{52}O_{16}Si_4Zr_1$ with a carbon to silicon+zirconium ratio of 6.4.

Both ends of the nanofilter member were impregnated with the ORMOCER. The impregnated region extended to a height of 5 mm. After draining and solidifying the ORMOCER, it was cross-linked by being baked at 150° C. for two hours, the temperature increasing at a speed of 30° C./hour, and the cycle including a pause of 16 hours at 65° C.

The quality of this impregnation was monitored. By observing a polished section under a microscope, it was possible to verify that the pores were completely filled. Moreover, it was not possible to show up any residual porosity in the impregnated region. Finally, a mercury porosimeter did not detect any pores in the region containing the ORMOCER.

A chemical corrosion test performed by alternately filtering nitric acid solution (10% by mass), and then sodium hydroxide (10% by mass) was conducted 100 times on the membrane without causing any degradation in the characteristics of the end.

EXAMPLE 4

The end of a filter member was to be sealed, the member being constituted by a metal tube (inside diameter 7 mm) having porosity of 33% and pore diameter of 7 μm, and covered with a plurality of layers of porous ceramic (layers having mean pore diameter of 800 nm, then 200 nm, and finally 20 nm).

For this purpose, an ORMOCER was prepared by prehydrolyzing trichlorovinyl silane (45 millimoles) and 0.05 millimoles of hydrochloric acid in aqueous solution, and 50 ml of equimolar water-ethanol solution as the solvent. The reaction took place in the absence of air and at ambient temperature for 15 hours. 4 millimoles of titanium hydroxide were then added. After the solvents had been removed, a viscous liquid (viscosity: 98 mPas) was obtained.

Chemical analysis gave the following formula for the ORMOCER:

$C_{23}H_{34}O_5Si_{11}Ti_1$ with a carbon to silicon and titanium ratio of 1.92

Both ends of the filter member were then impregnated by immersing them in the ORMOCER stirred by ultrasound. The ORMOCER penetrated into the pores of the end of the block and extended over a length of 12 mm. After draining off the surplus ORMOCER, the remainder was cross-linked by being baked. After a first pause of 10 hours at 50° C., the temperature increased at a speed of 10° C./hour to 140° C. and paused thereat for 6 hours.

By observation under a scanning electron microscope, it was possible to verify that the pores in the end of the filter member were completely filled. Pycnometer readings taken over the impregnated region of the porous block showed residual porosity of 0.08%, i.e. 0.26% of the initial porosity. It was not possible to measure a pore diameter with a mercury porosimeter.

A corrosion test was performed alternately under acid conditions ($HNO_3$ 6% by mass, pH=0, at 80° C.) and under basic conditions (NaOH 10% by mass, pH>14, and 90° C.). No reduction in filling characteristics was shown up after 150 corrosion cycles.

EXAMPLE 5

The end of a multi-channel filter member made of a porous ceramic (porosity 18%, pore diameter 4 µm) was to be sealed, each of the channels in the filter member being covered by an ultrafiltration layer (pore diameter 10 nm).

For this purpose, an ORMOCER was prepared by prehydrolyzing triethoxy vinyl silane (40 millimoles) with water (10 millimoles), in the presence of 5 millimoles of hydrochloric acid in an alcohol solution. 20 millimoles of ethoxy tantalum were then added. After 30 minutes of stirring, a further 30 millimoles of water were added. Condensation was continued at 70° C. for 5 hours. After the condensation products and the solvents had been removed, a liquid having viscosity of 53 mPas was obtained.

Chemical analysis gave the following composition for the ORMOCER:

$$C_4H_6O_5Si_2Ta_1$$

with a carbon to silicon and tantalum ratio of 1.33.

Both ends of the multi-channel member were impregnated by immersing them in the ORMOCER bath being stirred ultrasonically. The impregnated region extended over a distance of 8 mm. After draining and solidifying the ORMOCER, it was cross-linked by being baked at 125° C. for 5 hours, the temperature being increased at a speed of 2° C./hour, and pausing at 75° C. for 3 hours.

Macroscopic observation of the macroporous block showed that the pores were completely filled. The residual porosity of the impregnated region of the multi-channel filter member was 0.03%, i.e. 0.17% of the initial porosity, and it was not possible to measure any pores in said region by using a mercury porosimeter.

The filter member prepared in this way was subjected to an alternating corrosion test ($HNO_3$ 10% pH<0 and 60° C., NaOH 15%, pH>14, and 90°) under filtration. After 150 acid—rinsing—sodium hydroxide—rinsing cycles, the characteristics of the end of the block remained unchanged.

EXAMPLE 6

The end of an alumina tube (inside diameter 25 mm) having porosity of 38% and pore diameter of 12 µm was to be sealed, the porosity of the end having been previously reduced to 28% by inserting ceramic particles.

An ORMOCER was prepared by prehydrolyzing glycidoxypropyl trimethoxy silane (240 millimoles) by adding 1 millimole of hydrochloric acid in ethanol solution and 50 millimoles of water, while stirring for 30 minutes. 30 millimoles of aluminum phenoxide and 35 millimoles of tetra ethoxy hafnium were then added, followed by 15.4 millimoles of hydrochloric acid in ethanol solution and 75 millimoles of water. Condensation was continued for 6 hours at 60° C. After the solvents and the condensation exhaust products had been removed, a liquid having viscosity of 68 mPas was obtained.

Chemical analysis of the ORMOCER gave the following as its composition:

$$C_{22}H_{41}O_{18}Si_4Al_{0.46}Hf_{0.54}$$

with a carbon to silicon and aluminum and hafnium ratio of 4.4.

Both ends of the tube were impregnated by immersing them in the ORMOCER bath, with the ORMOCER penetrating into the block over a distance of 10 mm. After draining and solidifying the ORMOCER, it was cross-linked by being baked at 100° C. for 10 hours, the temperature being increased at a speed of 8° C./minute (with an intermediate period of 3 hours during with the temperature paused at 55° C.).

Observation under a microscope showed that the pores in the end of the tube had been completely filled. The porosity of the impregnated region was 0.05%, i.e. 0.18% of the initial porosity. Moreover, no pore was detected by a mercury porosimeter. A corrosion test was performed under acid conditions ($HNO_3$ 6% by mass, 65° C., pH<0) and under basic conditions (NaOH 10% by mass, 95° C., pH<14), and under filtration. After 150 acid—rinsing—base—rinsing cycles, the characteristics of the end of the block remained unchanged.

EXAMPLE 7

For the purposes of sealing the end of the filter member described in example 4, an ORMOCER was prepared by prehydrolyzing propargyl trimethoxy silane (175 millimoles) with 0.2 millimoles of hydrochloric acid in an alcohol solution and 55 millimoles of water, while stirring for 30 minutes. 11 millimoles of tungsten acetyl acetonate were then added, followed by 5.3 millimoles of hydrochloric acid in ethanol solution. Condensation was continued for 6 hours at 60° C. After the solvents and the condensation exhaust products had been removed, a liquid having viscosity of 68 mPas was obtained.

Chemical analysis of the ORMOCER gave the following composition:

$$C_{48}H_{48}O_{48}Si_{16}W_1$$

with a carbon to silicon and tungsten ratio of 2.82.

Both ends of the tube were impregnated by being immersed in the ORMOCER bath, with the ORMOCER penetrating into the block over a distance of 10 mmp. After draining and solidifying the ORMOCER, it was cross-linked by being baked at 100° C. for 10 hours, the temperature being increased at a speed of 8° C./minute (with an intermediate period of 3 hours during which the temperature paused at 55° C.).

Observation under a microscope showed that the pores in the end of the tube were filled completely. The porosity of the impregnated region was 0.01%, i.e. 0.003% of the initial porosity. Moreover, no pore was detected by a mercury porosimeter.

A corrosion test was performed under acid conditions (HNO₃ 6% by mass, 65° C., pH<0) and under basic conditions (NaOH 10% by mass, 95° C., pH>14), and under filtration. After 150 acid—rinsing—base—rinsing cycles, the characteristics of the end of the block remained unchanged.

Naturally, the invention is not limited to the above-described embodiments. Any means may be replaced by equivalent means without going beyond the ambit of the invention.

We claim:

1. Membrane apparatus for performing filtration, separation or a catalytic reaction, the apparatus including:

a macroporous block having first and second ends, made of a material selected from the group consisting of a sintered ceramic, a sintered metal, glass, and carbon, and provided with parallel longitudinal through channels, the surface of each channel being covered with a respective membrane made of a membrane material selected from the group consisting of an organic substance, a sintered ceramic, glass, and carbon, and having finer pores than those of said block, or being permeable by diffusion;

the pores at both ends of said macroporous block being filled with a dense material, wherein said dense material is formed by a monometallic or polymetallic organic-inorganic polycondensate which has been subjected to heat treatment, wherein said polycondensate is ORMOSIL or ORMOCER, wherein ORMOSIL means organically modified silicate and ORMOCER means organically modified ceramic.

2. Apparatus according to claim 1, wherein said pores at both ends of said macroporous block are previously made smaller by depositing small particles therein.

3. Apparatus according to claim 1, wherein said dense material has the following generic formula:

$$C_vH_wO_xSi_yMe_z$$

where:
v=4 to 48
w=5 to 52
x=5 to 48
y=2 to 16
z=1 and where Me represents at least one metal selected from the group consisting of the metals of groups IVA, VA, VIA, IIIB, and IVB of the periodic table of elements, and v, y, and z in the formula for the dense material are selected such that the ratio v/(y+z) is less than 7.

4. Apparatus according to claim 3, wherein said ratio v/(y+z) is less than 5.

5. Apparatus according to claim 3, wherein said metal is selected from the group consisting of Ti, Zr, Hf, Ta, W, Al, and Si.

6. A filling method for filling the pores at the ends of the macroporous block in membrane apparatus according to claim 1, wherein said method comprises:

preparing an organic-inorganic condensate, wherein said preparing includes adding solvents or having solvents result, therefrom, said condensate being a precursor of the ORMOSIL or of the ORMOCER, being liquid, and being thermally polymerizable by means of reactive groups regularly distributed in the chain of the precursor;

removing the solvents added during the preparation or resulting therefrom before a polymerization is performed;

immersing each end of the macroporous block successively in the pure ORMOSIL/ORMOCER precursor; and polymerizing the precursor.

7. A filling method according to claim 6, wherein the polymerization is performed by increasing temperature as follows:

a) increasing temperature relatively slowly, wherein the temperature increases at a rate of 30° C./hour at the most;

b) pausing for a period at a temperature lying in the range between 60° C. to 100° C.; and c) heating up to a temperature lying in the range between 110° C. to 160° C., and pausing for a cross-linking period at said temperature lying in the range between 110° C. to 160° C.

8. A method according to claim 6, wherein during the operation in which the ends of said macroporous block are immersed, said precursor is stirred by ultrasound.

9. A method according to claim 6, wherein after the filling operation, the ends of said block are exposed to ionizing radiation.

10. A method according to claim 9, wherein the ionizing radiation is selected from the group consisting of gamma radiation and electron radiation.

11. Membrane apparatus for performing filtration, separation or a catalytic reaction, the apparatus including:

a macroporous block having first and second ends, made of a material selected from the group consisting of a sintered ceramic, a sintered metal, glass, and carbon, and provided with parallel longitudinal through channels, the surface of each channel being covered with a respective membrane made of a membrane material selected from the group consisting of an organic substance, a sintered ceramic, glass, and carbon, and having finer pores than those of said block, or being permeable by diffusion, said membrane material being modified by being doped with catalysts;

the pores at both ends of said macroporous block being filled with a dense material, wherein said dense material is formed by a monometallic or polymetallic organic-inorganic polycondensate which has been subjected to heat treatment, wherein said polycondensate is ORMOSIL or ORMOCER, wherein ORMOSIL means organically modified silicate and ORMOCER means organically modified ceramic.

12. Apparatus according to claim 11, wherein said pores at both ends of said macroporous block are previously made smaller by depositing small particles therein.

13. Apparatus according to claim 11, wherein said dense material has the following generic formula:

$$C_vH_wO_xSi_yMe_z$$

where:
v=4 to 48
w=5 to 52
x=5 to 48
y=2 to 16
Z=1 and where Me represents at least one metal selected from the group consisting of the metals of groups IrA, VA, VIA, IIIB, and IVB of the periodic table of elements, and v, y, and z in the formula for the dense material are selected such that the ratio $v/(y+z)$ is less than 7.

14. Apparatus according to claim 13, wherein said ratio $v/(y+z)$ is less than 5.

15. Apparatus according to claim 13, wherein said metal is selected from the group consisting of Ti, Zr, Hf, Ta, W, Al, and Si.

16. A filling method for filling the pores at the ends of the macroporous block in membrane apparatus according to claim 11, wherein said method comprises:

preparing an organic-inorganic condensate, wherein said preparing includes adding solvents or having solvents result therefrom, said condensate being a precursor of the ORMOSIL or of the ORMOCER, being liquid, and being thermally polymerizable by means of reactive groups regularly distributed in the chain of the precursor;

removing the solvents added during the preparation or resulting therefrom before a polymerization is performed;

immersing each end of the macroporous block successively in the pure ORMOSIL/ORMOCER precursor; and polymerizing the precursor.

17. A filling method according to claim 16, wherein the polymerization is performed by increasing temperature as follows:

a) increasing temperature relatively slowly, wherein the temperature increases at a rate of 30° C./hour at the most;

b) pausing for a period at a temperature lying in the range between 60° C. to 100° C.; and c) heating up to a temperature lying in the range between 110° C. to 160° C., and pausing for a crosslinking period at said temperature lying in the range between 110° C. to 160° C.

18. A method according to claim 16, wherein, during the operation in which the ends of said macroporous block are immersed, said precursor is stirred by ultrasound.

19. A method according to claim 16, wherein, after the filling operation, the ends of said block are exposed to ionizing radiation.

20. A method according to claim 19, wherein the ionizing radiation is selected from the group consisting of gamma radiation and electron radiation.

* * * * *